US011416863B2

(12) United States Patent
Chamberlain et al.

(10) Patent No.: US 11,416,863 B2
(45) Date of Patent: Aug. 16, 2022

(54) SYSTEM AND METHODS FOR ASSESSING RISK OF FRAUD IN AN ELECTRONIC TRANSACTION

(71) Applicant: Wells Fargo Bank, N.A., San Francisco, CA (US)

(72) Inventors: Kelley A. Chamberlain, Huntersville, NC (US); David J. Dietrich, Charlotte, NC (US); Michael Knorr, Fairfield, CT (US); Robert L. Kosicki, Huntersville, NC (US); Valeria J. Gray-Lindsey, Charlotte, NC (US); Duane F. Lindquist, Glenview, IL (US); Michael Mangieri, West Islip, NY (US); Maria V. Marmolejos, San Francisco, CA (US); Jacqueline A. Monteferrario, Franklin Lakes, NJ (US); Yonesy F. Nunez, Allentown, PA (US); Leonard J. Valentino, Stamford, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 276 days.

(21) Appl. No.: 15/950,826

(22) Filed: Apr. 11, 2018

(65) Prior Publication Data

US 2019/0318358 A1 Oct. 17, 2019

(51) Int. Cl.
*G06Q 20/40* (2012.01)
*H04W 4/02* (2018.01)
(Continued)

(52) U.S. Cl.
CPC ..... *G06Q 20/4016* (2013.01); *G06Q 20/4014* (2013.01); *G06Q 40/08* (2013.01); *H04W 4/02* (2013.01); *H04W 4/12* (2013.01)

(58) Field of Classification Search
CPC .......... G06Q 20/4016; G06Q 20/4014; G06Q 20/3223

See application file for complete search history.

(56) References Cited

U.S. PATENT DOCUMENTS 7,647,253 B1 1/2010 Yeung
7,908,645 B2 3/2011 Varghese et al.
(Continued)

FOREIGN PATENT DOCUMENTS

WO WO-2019046829 A1 * 3/2019 ......... G06Q 20/3224

OTHER PUBLICATIONS

"How Industry Professionals Can Avoid and Respond to Wire Fraud", Nov. 14, 2017. Available at: https://www.texasnationaltitle.com/article/how-industry-professionals-can-avoid-and-respond-wire-fraud (Year: 2017).*

(Continued)

*Primary Examiner* — Calvin L Hewitt, II
*Assistant Examiner* — Gregory Harper
(74) *Attorney, Agent, or Firm* — Foley & Lardner LLP

(57) ABSTRACT

A computing system includes one or more processors and one or more computer-readable storage media communicatively connected to the one or more processors and having instructions stored thereon that, when executed, causes the one or more processors to receive a request from a user device to initiate an electronic transaction to a beneficiary, identify a risk associated with the beneficiary, calculate a risk score for the electronic transaction based on the risk, transmit a notification to the user device, wherein the notification causes display of one or more mitigation activities for reducing the risk, receive data from the user device associated with the one or more mitigation activities, compare the data with information corresponding to the beneficiary stored in a data store, recalculate the risk score based (Continued)

on the comparison, and transmit an electrical signal to the user device to cause the display of a result of the recalculation.

17 Claims, 8 Drawing Sheets

(51) Int. Cl.
*H04W 4/12* (2009.01)
*G06Q 40/08* (2012.01)

(56) References Cited

U.S. PATENT DOCUMENTS

| | | | |
|---|---|---|---|
| 7,958,027 | B2 | 6/2011 | Lawrence |
| 8,739,278 | B2 | 5/2014 | Varghese |
| 8,788,410 | B1* | 7/2014 | LoCasto ............... G06Q 20/10 705/39 |
| 8,990,948 | B2 | 3/2015 | Kumar et al. |
| 9,536,065 | B2 | 1/2017 | Bouse et al. |
| 9,646,301 | B2 | 5/2017 | Dimuro |
| 9,672,355 | B2 | 6/2017 | Titonis et al. |
| 9,699,205 | B2 | 7/2017 | Muddu et al. |
| 9,818,116 | B2 | 11/2017 | Caldera |
| 10,277,628 | B1* | 4/2019 | Jakobsson ............... H04L 51/00 |
| 10,630,645 | B1* | 4/2020 | Clemons, Jr. ....... H04L 63/1408 |
| 2003/0187716 | A1 | 10/2003 | Lee |
| 2003/0233278 | A1* | 12/2003 | Marshall ............ G06Q 30/0212 705/14.35 |
| 2003/0233319 | A1 | 12/2003 | Lawrence |
| 2006/0161435 | A1* | 7/2006 | Atef ........................ G06F 21/31 704/246 |
| 2006/0287953 | A1 | 12/2006 | Chauhan |
| 2008/0312998 | A1* | 12/2008 | Templeton ......... G06Q 30/0201 705/7.28 |
| 2009/0307778 | A1* | 12/2009 | Mardikar ............ G06Q 20/3278 726/26 |
| 2010/0145734 | A1* | 6/2010 | Becerra ................ G06Q 40/08 705/4 |
| 2012/0278201 | A1* | 11/2012 | Milne ................ G06Q 20/3224 705/26.41 |
| 2012/0330819 | A1 | 12/2012 | Weinflash et al. |
| 2013/0085942 | A1* | 4/2013 | Shiroi .................. G06Q 20/108 705/44 |
| 2014/0149283 | A1 | 5/2014 | Roselli et al. |
| 2014/0214676 | A1 | 7/2014 | Bukai |
| 2014/0279403 | A1 | 9/2014 | Baird et al. |
| 2014/0279526 | A1 | 9/2014 | Jackson |
| 2014/0325657 | A1 | 10/2014 | Bailey |
| 2015/0039513 | A1 | 2/2015 | Adjaoute |
| 2015/0058931 | A1 | 2/2015 | Miu et al. |
| 2015/0058950 | A1* | 2/2015 | Miu ........................ H04L 63/08 726/7 |
| 2015/0074763 | A1* | 3/2015 | Schwartz ................ H04L 63/20 726/4 |
| 2015/0154600 | A1* | 6/2015 | Diehl .................. G06Q 20/4016 705/39 |
| 2015/0161609 | A1* | 6/2015 | Christner ........... G06Q 20/4016 705/44 |
| 2016/0044054 | A1 | 2/2016 | Stiansen et al. |
| 2016/0086263 | A1 | 3/2016 | Weinflash et al. |
| 2016/0162882 | A1 | 6/2016 | McClung, III |
| 2016/0300196 | A1* | 10/2016 | Guido .................... G06Q 20/10 |
| 2016/0300197 | A1* | 10/2016 | Guido .................... G06Q 20/10 |
| 2016/0300204 | A1* | 10/2016 | Guido .................. G06Q 20/108 |
| 2017/0011382 | A1* | 1/2017 | Zoldi ................. G06Q 20/3227 |
| 2017/0011383 | A1* | 1/2017 | Melzer ................... G06Q 10/10 |
| 2017/0132635 | A1 | 5/2017 | Caldera |
| 2017/0186004 | A1* | 6/2017 | Chandramouli ... G06Q 20/3829 |
| 2017/0270534 | A1* | 9/2017 | Zoldi ...................... H04L 67/22 |
| 2017/0357971 | A1* | 12/2017 | Pitz ........................ H04W 64/00 |
| 2017/0364910 | A1* | 12/2017 | Malhotra ............... G06Q 20/40 |
| 2018/0005235 | A1* | 1/2018 | Thorne .................. H04L 9/3265 |
| 2018/0096351 | A1* | 4/2018 | Dahn ................... G06Q 20/223 |
| 2018/0160309 | A1* | 6/2018 | Turgeman ............. G06F 21/83 |
| 2018/0181964 | A1* | 6/2018 | Zagarese .......... G06Q 20/40145 |
| 2018/0336553 | A1* | 11/2018 | Brudnicki ......... G06Q 20/3829 |
| 2019/0095919 | A1* | 3/2019 | Legault ................... G06F 21/50 |
| 2019/0238533 | A1* | 8/2019 | Pointner ............. H04L 63/0853 |

OTHER PUBLICATIONS

Baber et al., "Final Evaluation Report of SPEEDD Dashboards for Credit Card Fraud management", Scalable Data Analytics, Dec. 2016. 36 pages.

* cited by examiner

SYSTEM AND METHODS FOR ASSESSING RISK OF FRAUD IN AN ELECTRONIC TRANSACTION

BACKGROUND

In the digital age, electronic transactions for payments from an originator (or payor) to a beneficiary (or payee) are common occurrences. Further, cyber-attacks such as phishing, spear phishing, spamming, and the like have increased exponentially. Such cyber-attacks generally target unsuspecting victims to electronically transfer funds to the fraudster's account. In some cases, these cyber-attacks include communications that are cloaked to appear to be from a trusted entity, such as from a known vendor, supplier, officer, employee, or the like. However, the account number, routing number, contact information, and other information that are provided in these communications are generally associated with the fraudster instead of the trusted entity.

SUMMARY

One arrangement of the present disclosure is a computing system of a provider institution. The system includes one or more processors and one or more computer-readable storage media communicatively connected to the one or more processors. The one or more computer-readable storage media have instructions stored thereon that, when executed by the one or more processors, cause the one or more processors to: provide an electronic transfer application to a user for installation on a user device, receive a request from the user device to initiate an electronic transaction to a beneficiary, identify a risk associated with the beneficiary, calculate a risk score for the electronic transaction based on the risk, transmit a notification associated with the electronic transaction over a wireless communication channel to the user device, wherein the notification activates the electronic transfer application to cause display of a dashboard on the user device, the dashboard indicating the risk associated with the electronic transaction and one or more mitigation activities for reducing the risk, receive data from the user device associated with the one or more mitigation activities, compare the data associated with the one or more mitigation activities with information corresponding to the beneficiary stored in a data store, recalculate the risk score based on the comparison, and transmit an electrical signal to the user device over the wireless communication channel to cause the electronic transfer application to display a result of the recalculation Another arrangement of the present disclosure is a method. The method includes: providing, by one or more processors of a computing system, an electronic transfer application to a user for installation on a user device, receiving, by the one or more processors, a request from the user device to process an electronic transaction to a beneficiary, identifying, by the one or more processors, a risk associated with the beneficiary, calculating, by the one or more processors, a risk score for the electronic transaction based on the risk, transmitting, by the one or more processors, a notification associated with the electronic transaction over a wireless communication channel to the user device, wherein the notification activates the electronic transfer application to cause display of a dashboard on the user device, the dashboard indicating the risk associated with the electronic transaction and one or more mitigation activities for reducing the risk, receiving, by the one or more processors, data from the user device associated with the one or more mitigation activities, comparing, by the one or more processors, the data associated with the one or more mitigation activities with information corresponding to the beneficiary stored in a data store, recalculating, by the one or more processors, the risk score based on the comparison, and transmitting, by the one or more processors, an electrical signal to the user device over the wireless communication channel to cause the electronic transfer application to display a result of the recalculation.

Another arrangement of the present disclosure is a non-transitory computer-readable medium. The non-transitory computer-readable medium has processor-readable instructions stored thereon such that, when executed by a processor, cause the processor to: provide an electronic transfer application to a user for installation on a user device, receive a request from the user device to process an electronic transaction for an electronic payment or an electronic transfer of funds from the user to a beneficiary, identify a risk associated with the beneficiary, calculate a risk score for the electronic transaction based on the risk, transmit a notification associated with the electronic transaction over a wireless communication channel to the user device, wherein the notification activates the electronic transfer application to cause display of a dashboard on the user device, the dashboard indicating the risk associated with the electronic transaction and one or more mitigation activities for reducing the risk, in response to the risk score being between a first threshold value corresponding to a minimum level of risk that would make fraud insurance appealing to the user and a second threshold value corresponding to a maximum level of acceptable risk to insure the electronic transaction, calculate a premium for the fraud insurance based on the risk score, receive data from the user device associated with the one or more mitigation activities, compare the data associated with the one or more mitigation activities with information corresponding to the beneficiary stored in a data store, recalculate the risk score based on the comparison, adjust the premium based on the recalculated risk score, and transmit an electrical signal to the user device over the wireless communication channel to cause the electronic transfer application to display an offer for the fraud insurance at the adjusted premium based on the recalculated risk score.

BRIEF DESCRIPTION OF THE DRAWINGS

The above and other aspects and features of the present disclosure will become more apparent to those skilled in the art from the following detailed description of the example arrangements with reference to the accompanying drawings, in which.

DETAILED DESCRIPTION

Figure 1:
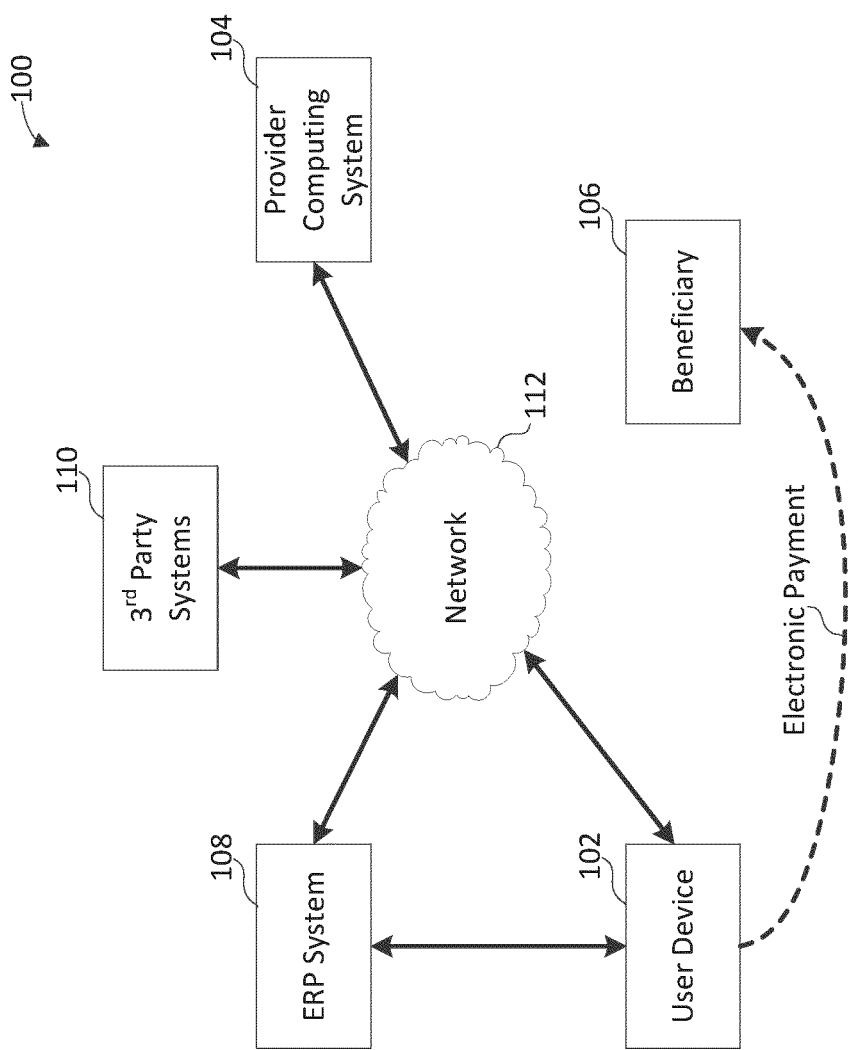
FIG. 1 is a diagram of an example of a system for providing automated fraud risk analysis services according to some arrangements.

One or more example arrangements described herein relate to systems, apparatuses, and methods for implementing Artificial Intelligence (AI) to identify a potential fraud risk from an electronic transaction corresponding to a payment or transfer of funds from a customer (an originator, an authorized account holder, a user, or payor) to a beneficiary of the payment. The AI system automatically calculates a risk score associated with the beneficiary of the payment, and notifies the customer based on the risk score of the potentially fraudulent beneficiary. In some arrangements, the AI system provides instructions to the customer to mitigate the risks involved with the transaction, and detects mitigation activities by the customer to mitigate the risks. In some arrangements, the AI system provides fraud insurance for purchase by the customer that covers a percentage or an entire amount of the electronic transaction in the case that the beneficiary is a bad actor (e.g., a fraudster), and reduces a premium associated with the fraud insurance based on the mitigation activities. As used in this specification, the terms "automatic" or "automatically" are defined as pertaining to an electronically carried out action that does not require outside (either human or machine) intervention to be scheduled, triggered, executed, and/or completed.

In general, the arrangements of the AI system described herein automate calculating risks associated with a beneficiary of an electronic payment that has not been previously automated. The AI system described herein can detect and analyze a customer's mitigation activities to reduce or mitigate the risk associated with the electronic transaction, and can determine whether the mitigation activities were sufficient to reduce or mitigate the risks associated with the beneficiary. For example, the AI system may verify that the customer has contacted the correct or likely entity that the beneficiary claims to be. The systems and methods disclosed herein can be adapted to monitor customers' account information, historical transaction data, $3^{rd}$ party data, and other data and activities to identify the risks and to detect the mitigation activities.

In an example arrangement, the AI system includes a particular and unique set of rules, which are set up to account for and learn from the customer's mitigation activities that would have required human intervention. Additionally, another particular and unique set of rules define automated transaction processing, notifications, risk score generation, electronic communications, and the like, which traditionally would have required an evaluation by a human being.

The arrangements of the AI system described herein improve computer-related technology by performing certain steps that cannot be done by conventional provider institution systems or human actors. For example, the AI system is configured to proactively determine risks of beneficiaries using context information, notify in real-time or near real-time the customer of the risks before approving the electronic transactions, and detecting mitigating factors from a customer's mitigation activities using context information. In some arrangements, to achieve benefits over conventional systems having databases, tables, and field definitions that are static, the databases described herein may be data-type agnostic and configured to store different information for different users, transaction types, and the like. Furthermore, to achieve benefits over conventional databases and to solve a technical problem of improving dimensional scalability (such that different aspects of transactions may be analyzed for different users on the same data storage infrastructure as an autonomous bill pay bot learns the relevant aspects through pattern mining and machine learning), and faster identification of the risks and mitigating factors by reducing computer processing times for analyzing transactions of customers and available information from multiple sources, the data stored in multidimensional form may be aggregated and/or stored using improved methods. For example, the risk score of the beneficiary may be dynamically calculated and/or adjusted after being stored when the data is retrieved for analysis and/or transaction processing.

In some arrangements, if the AI system identifies potential risks associated with the beneficiary of the electronic transaction, the AI system sends a notification or otherwise notifies the customer of the potential risks. For example, the AI system may visually display (e.g., via an electronic user interface such as an interactive dashboard) or otherwise indicate on a user device associated with the customer, one or more risk attributes associated with the beneficiary. The system can then provide instructions for one or more mitigation activities that the customer can perform in order to reduce or mitigate the risk. In a non-limiting example, the system can apply the risk analysis to determine whether the electronic transaction qualifies for fraud insurance, and can adjust a premium for the fraud insurance based on the customer's mitigation activities. Accordingly, arrangements described herein solve the technical problem of determining the appearance and functionality of an electronic user interface for notifying the customer of a potentially risky beneficiary, and for detecting mitigation activities by the customer to mitigate or reduce the risks. Further, arrangements described herein solve the internet-centric problem of automating data collection from customers' mitigation activities, and providing these services in a convenient manner (e.g., via a mobile device of a customer using push notifications, messages, or other alerts).

FIG. 1 is a diagram of an example of a system 100 for providing automated fraud risk analysis services according to some arrangements. Referring to FIG. 1, a user (e.g., a customer, an authorized account user, or originator) of a user device 102 is a customer of a provider institution associated with a provider computing system 104. The user of the user device 102 may be any suitable entity (e.g., an individual, a company, or the like). In some arrangements, the provider institution may be a financial institution. Accordingly, the user may have an account (e.g., checking account, savings account, credit account, mortgage account, and/or the like) established with the provider institution, and the provider institution may store information corresponding to the user. For example, the provider institution may store a profile corresponding to the user in a data store (e.g., account database 240 in FIG. 2 or the like) accessible by the provider computing system 104. In some arrangements, the profile corresponding to the user may include information corresponding to the user, such as, for example, name, address, telephone number, business type, industry type, business hours, working days or non-working days, number of employees, net worth, assets, liabilities, and/or the like.

In some arrangements, the provider institution can collect and store transactional information in the course of dealing (e.g., processing transactions, offering products/services, and the like) with the user and other customers of the provider institution. For example, the user may operate the electronic device 102 to initiate an electronic transaction with the provider computing system 104 to make a payment to a beneficiary 106. The beneficiary 106 may be any suitable entity (e.g., an individual, a company, or the like). The electronic transaction may be processed by the provider computing system 104, and transactional information corresponding to the electronic transaction may be collected and stored. In some arrangements, the transactional information may include, for example, information corresponding to the beneficiary (e.g., name, account and routing number, location or address, industry or business, and/or the like), transaction type, location where the transaction was initiated, amount of the transaction, date of the transaction, time of the transaction, and/or the like.

In some arrangements, the user device 102 may be connected to a resource management system (e.g., an enterprise resource planning (ERP) system, or the like) 108 to manage day-to-day business activities, such as accounting and procurement. The ERP system 108 may store information for trading partners (e.g., vendors, suppliers, and/or the like). For example, the ERP system 108 may store the name, phone number, email address, location or address, industry or business, financial account information (e.g., account and routing number), and/or the like for a trading partner. The user may access the ERP system 108 (e.g., via the user device 102 or any suitable device) to input, delete, edit, and/or identify trading partner information for a trading partner.

In some arrangements, the provider computing system 104 may be connected to the ERP system 108 to collect (e.g., via an application programming interface API or the like) or otherwise receive the trading partner information. In this case, the provider computing system 104 can store (e.g., in the account database 240, the contacts database 252, or any suitable data store) the trading partner information, and may use the trading partner information to verify contact information for the trading partner. For example, when the user performs mitigation activities, the provider computing system 104 may analyze the mitigation activities to identify whether the contact information corresponding to the trading partner information was used to verify information with the beneficiary. Further, when a trading partner is added, edited, removed, or otherwise updated from the ERP system 108, the provider computing system 104 can receive and/or store the updates.

In some arrangements, the provider computing system 104 may be connected to one or more $3^{rd}$ party systems 110 to collect (e.g., via API) or otherwise receive $3^{rd}$ party data that may be used to identify risks in an electronic transaction. For example, in some arrangements, the provider computing system 104 may collect or otherwise receive public records data (e.g., entity, corporation, or other business data) from a public records service, news data from a news service, documents and other document-related data from a document service, media (e.g., video, images, audio, social media, etc.) from a media service, authority data from an authority alert service, and/or the like. The provider computing system 104 may use the $3^{rd}$ party data to identify risks or potentially fraudulent beneficiaries. For example, if a beneficiary has been recently dissolved, then any subsequent payments made to the beneficiary may be identified as a risky transaction. Similarly, if a beneficiary has been identified by news media outlets as being a bad actor (e.g., a fraudster), then any payments made to the beneficiary may be identified as a risky transaction. As a further example, if a particular transaction includes one or more characteristics of a recent fraud trend as identified through media outlets or authority alerts, then the particular transaction may be identified as being a risky transaction.

In some arrangements, the $3^{rd}$ party systems 110 may include a contacts management system that collects and stores contact information for various entities. The provider computing system 104 may collect, query, or otherwise receive (e.g., via API) the contact information corresponding to a beneficiary that is maintained by the $3^{rd}$ party systems 110. In this case, the provider computing system 104 may use the contact information for the beneficiary to determine whether the customer's mitigation activities are sufficient to reduce or mitigate the risks associated with the beneficiary of the electronic transaction. For example, the provider computing system 104 may compare the contact information for the beneficiary used by the customer to verify information with the beneficiary with the contact information for the beneficiary stored in the contacts management system, to determine whether the customer contacted the likely or correct entity that the beneficiary claims to be.

Still referring to FIG. 1, the user device 102, ERP system 108, and $3^{rd}$ party systems 110 are connected to the provider computing system 104 via a communication network 112. The communication network 112 is any suitable Local Area Network (LAN) or Wide Area Network (WAN). For example, the communication network 112 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology 1×), General Packet Radio Service (GPRS), Personal Communications Service (PCS), 802.11X, ZigBee, Bluetooth, Wi-Fi, any suitable wired network, combinations thereof, and/or the like. The communication network 112 is structured to permit the exchange of data, values, instructions, messages, and the like among the provider computing system 104 and the user device 102, ERP system 108, and $3^{rd}$ party systems 110.

Figure 2B:
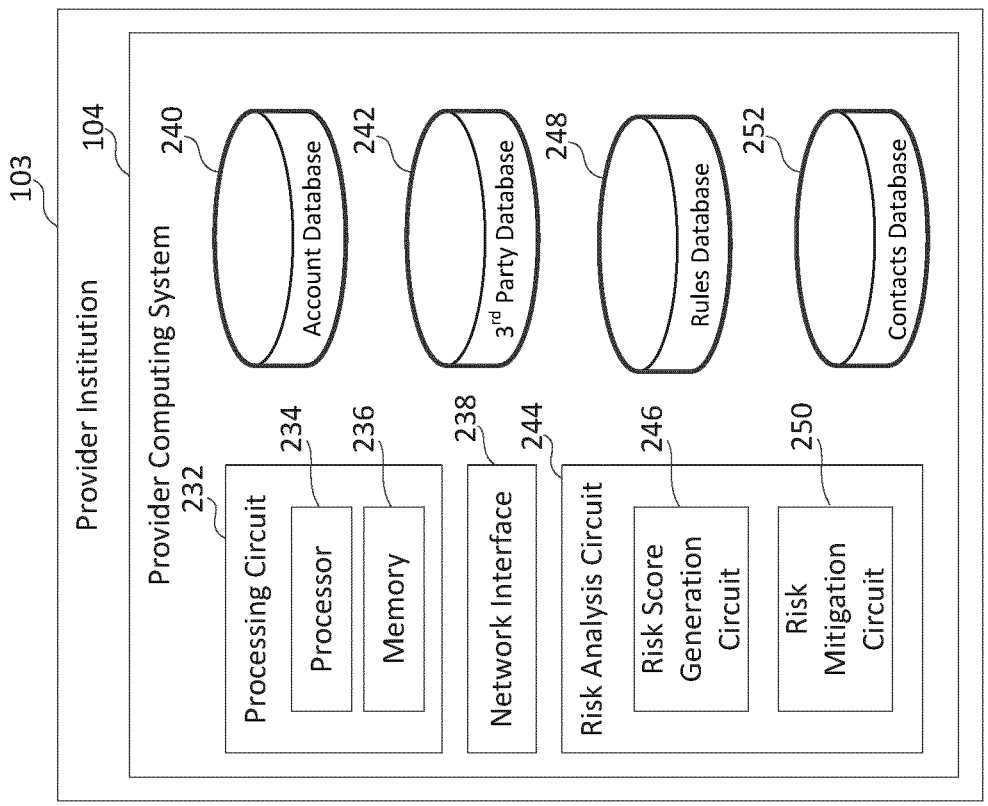
FIG. 2B is a diagram of an example of the provider computing system of the system set forth in FIG. 1, according to some arrangements.
Figure 2A:
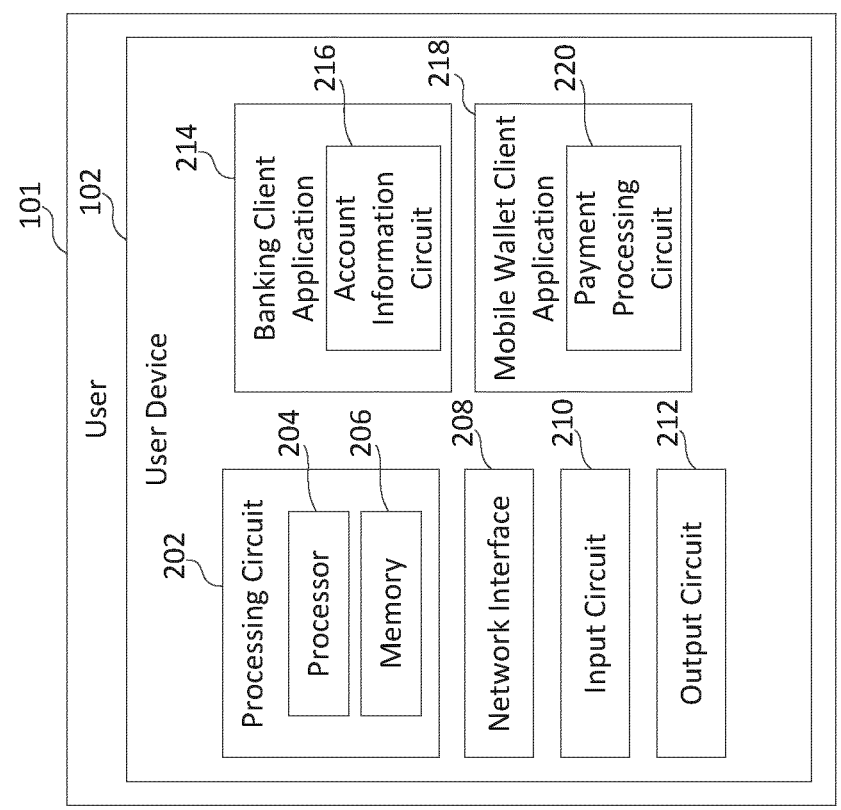
FIG. 2A is a diagram of an example of the user device of the system set forth in FIG. 1, according to some arrangements.

FIG. 2A is a diagram of an example of the user device 102 of the system 100 set forth in FIG. 1, according to some arrangements. FIG. 2B is a diagram of an example of the provider computing system 104 of the system 100 set forth in FIG. 1, according to some arrangements. Referring to FIGS. 1 through 2B, a user (customer, authorized account user, or originator) 101 operates or otherwise interacts with the user device 102. The user 101 may be any suitable entity (e.g., an individual, a company, or the like). The user device 102 may be any suitable device (e.g., a desktop computer, laptop, tablet, smart phone, mobile phone, or the like).

In some arrangements, the user device 102 includes a processing circuit 202 having a processor 204 and memory 206. The processor 204 can be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 206 can be implemented with a Random Access Memory (RAM), Read-Only Memory (ROM), Non-volatile RAM (NVRAM), Flash Memory, hard disk storage, and other suitable electronic storage. The memory 206 stores data and/or computer code for facilitating the various processes described herein. The memory 206 stores instructions or programming logic that, when executed by the processor 204, controls the operations of the user device 102. Moreover, the memory 206 is or includes tangible, non-transient volatile memory or non-volatile memory. Accordingly, the memory 206 includes database components, object code components, script components, or any other type of information structure for supporting the various activities and information structures described herein.

The user device 102 is shown to include various circuits and logic for implementing the activities described herein. For example, the user device 102 includes one or more of the processing circuit 202, network interface 208, input circuit 210, output circuit 212, a banking client application 214, a mobile wallet client application 218, and/or the like. While various circuits, interfaces, and logic with particular functionality are shown, it should be understood that the user device 102 includes any number of circuits, interfaces, and logic for facilitating the functions described herein. For example, the activities of multiple circuits may be combined as a single circuit and implemented on a same processing circuit (e.g., the processing circuit 202), or additional circuits with additional functionality may be further included.

The network interface 208 is configured for and structured to establish a communication session via the communication network 112 with the provider computing system 104. The network interface 208 may include any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The input circuit 210 is configured to receive user input from the user 101. The output circuit 212 is configured to output information in the form of graphics, sound, tactile feedback (e.g., vibrations), and the like. In this regard, the input circuit 210 and the output circuit 212 are structured to exchange data, communications, instructions, and the like with an input/output component of the user device 102. Accordingly, in some arrangements, the input circuit 210 and the output circuit 212 can be combined into an input/output circuit that includes or is connected to an input/output device such as, but not limited to, a display device, touchscreen, keyboard, microphone, and/or the like. In some arrangements, the input/output circuit includes communication circuitry for facilitating the exchange of data, values, messages, and the like between the input/output device and the components of the user device 102. In some arrangements, the input circuit 210 and the output circuit 212 include machine-readable media for facilitating the exchange of information between the input/output device and the components of the user device 102. In still other arrangements, the input circuit 210 and the output circuit 212 may include any combination of hardware components (e.g., a touchscreen), communication circuitry, and machine-readable media.

One or more of the banking client application 214 and mobile wallet client application 218 may be server-based applications executable on the user device 102. In this regard, the user 101 may download the banking client application 214 and/or the mobile wallet client application prior to usage, or at least one of the banking client application 214 or the mobile wallet client application may be pre-installed (e.g., by a manufacturer, distributor, service provider, or the like) on the user device 102. In another arrangement, the banking client application 214 and/or mobile wallet client application 218 are coded into the memory 206 of the user device 110. In still another arrangement, the banking client application 214 and/or mobile wallet client application 218 are web-based interface applications. In this case, the user 101 logs onto or otherwise accesses the web-based interface. In this regard, at least one of the banking client application 214 and mobile wallet client application 218 is supported by a separate computing system comprising one or more servers, processors, network interface modules, etc., that transmit the applications for use to the user device 102. In an arrangement, one or more of the banking client application 214 and/or mobile wallet client application 218 include an API and/or a Software Development Kit (SDK) that facilitate integration of other applications. All such variations and combinations are intended to fall within the spirit and scope of the present disclosure.

The banking client application 214 is communicably coupled to the provider computing system 104 (e.g., the account database 240) via the communication network 112, and is structured to permit management of at least one account of the user 101 via the banking client application 214. In this regard, the banking client application 214 provides indicative displays (or dashboards) of account information such as, but not limited to, current account balances, pending transactions, profile information (e.g., contact information), rewards associated with the account, bill pay information and/or the like. In some examples, a bill pay option is provided by the banking client application 214, where the bill pay option allows the user 101 to pay bills in response to user input. Further, in some arrangements, the banking client application 214 is configured to process payments from the user 101 to a designated beneficiary. For example, a user may initiate via the banking client application 214 a transfer or payment (e.g., a wire transfer) from an account (e.g., checking or savings) associated with the user 101 to an account associated with the designated beneficiary. The account associated with the designated beneficiary may be established with the same provider institution 103 or a different provider institution.

Thus, via the banking client application 214, the user 101 may pay bills (e.g., credit card, mortgage, and the like), view balances, pay merchants or trading partners (e.g., suppliers and vendors), and otherwise manage accounts. Accordingly, the banking client application 214 includes an account information circuit 216. The account information circuit 216 is linked or otherwise connected to one or more accounts (as stored in the account database 240) associated with the user 101, and permit management of the associated accounts (e.g., transfer balances between accounts, view payment history, and the like) by communicating with the provider computing system 104. In some arrangements, the banking client application 214 is communicably connected to the mobile wallet client application 218. As such, in response to a mobile payment via the mobile wallet client application 218, the mobile wallet client application 218 causes the banking client application 214 to update the payment account (e.g., the account associated with the mobile payment). Accordingly, in some arrangements, the applications 214 and 218 may be communicably connected to each other to enable actions supported by each respective application.

The mobile wallet client application 218 is communicably connected to the provider computing system 103 (e.g., the account database 240) via the communication network 112 and is structured to facilitate purchases, payments, or transfers by the user 101 via the mobile wallet client application 218. Accordingly, the mobile wallet client application 218 is linked with or otherwise connected to one or more accounts (as stored in the account database 240) of the user 101. In operation, when at a point-of-sale terminal (POS terminal) or the like, the user 101 initiates the mobile wallet client application 218 and provides a passcode (e.g., biometrics such as a thumbprint, a Personal Identification Number (PIN), a password, or the like) to authenticate the use 101, and selects the desired source payment account (e.g., a checking account from the provider institution 103 that is linked to the mobile wallet client application 218). The aforementioned payment information is provided to the POS terminal or to the merchant (e.g., via NFC, via barcode presentment, or the like) via communication with the payment terminal (e.g., via near field communication), and the payment transaction is sent to the provider computing system (e.g., via network 112) to be processed.

Accordingly, the mobile wallet client application 218 is communicably connected via the network interface 208 over the communication network 112 to the provider computing system 104. As shown, the mobile wallet client application 218 includes a payment processing circuit 220 structured to facilitate payments by the user 101 via the mobile wallet client application 218. For example, the payment processing circuit 220 enables a quick-pay capability with a merchant, supplier, or vendor. In this regard, the payment processing circuit 220 includes or is communicably connected with a communication device (e.g., a near-field communication chip) that facilitates the exchange of information between the mobile wallet client application 218 and a POS terminal or the like.

Still referring to FIGS. 1 through 2B, in some arrangements, the provider institution 103 is a financial institution or the like having at least one associated provider computing system 104. In some arrangements, the provider institution 103 provides products and services such as, but not limited to, credit card accounts, mobile wallet, checking/saving accounts, retirement accounts, mortgage accounts, loan accounts, investment accounts, and/or the like to the user (or originator) 101 via the provider computing system 104.

In some arrangements, the provider computing system 104 includes a processing circuit 232 including a processor 234 and a memory device 236. The processor 234 can be implemented with a general-purpose processor, an ASIC, one or more FPGAs, a DSP, a group of processing components that are distributed over various geographic locations or housed in a single location or device, or other suitable electronic processing components. The memory 236 can be implemented with RAM, NVRAM, ROM, Flash Memory, hard disk storage, cloud storage, and other suitable electronic storage devices. The memory 236 stores data and/or computer code for facilitating at least some of the various processes described herein. The memory 236 includes tangible, non-transient volatile memory, or non-volatile memory. The memory 236 stores instructions or programming logic that, when executed by the processor 234, controls the operations of the provider computing system 104. In some arrangements, the processor 234 and the memory 236 form various processing circuits in the provider computing system 104.

As shown in FIG. 2B, the provider computing system 104 includes a network interface 238. The network interface 238 is structured for sending and receiving data over the communication network 112 (e.g., to and from the user device 102, the ERP system 108, the $3^{rd}$ party systems 110, and the like). Accordingly, the network interface 238 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The provider computing system 104 includes an account database 240 that stores customer profile information and account information relating to one or more accounts associated with the user 101 and other customers of the provider institution 103. The account database 240 stores transaction history data of transactions (e.g., payment transactions) made by the user 101 using one or more accounts and by other customers, for example, with the banking client application 214, the mobile wallet client application 218, and/or other suitable applications. The banking client application 214 and the mobile wallet application 218 permits payments to be sent to the beneficiary 106 via the user device 102. In some arrangements, if the user has configured an ERP system 108 to send trading partner information to the provider computing system 104, the trading partner information may be stored in the account database 240 or any suitable storage device (e.g., the contacts database 252).

In some arrangements, the provider computing system 104 includes a $3^{rd}$ party database 242 that stores $3^{rd}$ party data received from $3^{rd}$ party systems 110. For example, the $3^{rd}$ party data may include public records data (e.g., entity, corporation, or other business data) from a public records service (e.g., secretary of state), news data from a news service, documents and other document-related data from a document service, media (e.g., video, images, audio, social media, etc.) from a media service, authority data from an authority alert service, contacts information from a contacts management service, and/or the like. However, the present disclosure is not limited thereto, and in some arrangements, the $3^{rd}$ party database 242 may be omitted. For example, the provider computing system 104 may have an interface to pull or receive data (e.g., via an API) periodically, as needed, or desired from one or more external databases associated with the $3^{rd}$ party systems 110.

The provider computing system 104 includes a risk analysis circuit 244. The risk analysis circuit 244 is capable of identifying risks based on information corresponding to the beneficiary. For example, the risk analysis circuit 244 can determine a name, location, address, or other beneficiary information based on one or more attributes in the electronic transaction data. Further, the risk analysis circuit 244 can analyze transactions histories of the user 101 and other customers stored in the account database 240 to identify if the user 101 or other customers have transacted with the beneficiary in the past. In some arrangements, the risk analysis circuit 244 may analyze $3^{rd}$ party data stored in the $3^{rd}$ party database 242 or otherwise received from the $3^{rd}$ party systems 110 to determine if the $3^{rd}$ party data contains any information corresponding to the beneficiary. For example, the risk analysis circuit 244 may determine from public records data whether the beneficiary is incorporated or otherwise established as a legal business. In another example, the risk analysis circuit 244 may determine from media data or authority data whether the beneficiary has been involved in any activities (legal or otherwise) that have been reported on.

In some arrangements, the provider computing system 104 includes a rules database 248 for storing rules (such as but not limited to, threshold limits or values). In some arrangements, the rules may be user-defined and the risk analysis circuit 244 may use the rules to determine risks in the pending transactions. For example, the user may define the circumstances in which the user should be alerted of electronic transactions that violate one or more of the rules. In some arrangements, the rules may be predefined or automatically generated by the provider computing system 104. For example, the rules may be automatically generated based on market trends, data mining, and machine learning. In some arrangements, the rules may include exceptions (or whitelists) to one or more of the rules, in which the user defines situations in which a rule may be ignored. For example, while a general rule to notify the user for transactions exceeding a particular monetary amount may be defined, the user may include an exception to the rule for a particular beneficiary.

Upon receiving user-defined or automatically generated rules, the rules are indexed and stored in the rules database 248. A non-exhaustive list of some of the rules may include, for example, dollar amount range, geographical limitations, expected time and date of transactions, industry, purpose for the transactions, frequency of transactions, fraud or market trends, exceptions to the rules (e.g., whitelists), and/or the like. However, the present disclosure is not limited thereto, and the rules may include any suitable user-defined or automatically generated rules based on enriched data available or learned (e.g., via data mining or machine learning) from transactions conducted on the provider computing system 104.

Accordingly, in various arrangements, the risk analysis circuit 244 is communicatively connected to the account database 240, $3^{rd}$ party database 242, rules database 248, and other databases managed by or connected to the provider computing system 104. For example, the risk analysis circuit 244 is connected to the account database 240 to access (e.g., query) the account/profile information, historical transaction information, and/or trading partner information stored thereon. The risk analysis circuit 244 can also gather the $3^{rd}$ party data by accessing (e.g., querying) the $3^{rd}$ party database 242 or other external $3^{rd}$ party databases. For example, the risk analysis circuit 244 can query the $3^{rd}$ party databases with suitable APIs. Further, the risk analysis circuit 244 is connected to the rules database 248 to access (e.g., query) the user-defined and/or automatically generated rules.

In some arrangements, the risk analysis circuit 244 is operatively connected to one or more of the components of the provider computing system 104. For example, the risk analysis circuit 244 is connected to the network interface 238 for communicating with one or more of the user device 102, the ERP system 108, and/or the $3^{rd}$ party systems 110. In some arrangements, the risk analysis circuit 244 may be implemented with the processing circuit 232. For example, the risk analysis circuit 244 can be implemented as a software application stored within the memory 236 and executed by the processor 234. Accordingly, such examples can be implemented with minimal or no additional hardware costs. However, in other arrangements, the risk analysis circuit 244 may be implemented on dedicated hardware specifically configured for performing the operations of the risk analysis circuit 244 described herein.

In some arrangements, the risk analysis circuit 244 includes a risk score generation circuit 246 that generates a risk score for an electronic transaction based on context information, historical transaction data, beneficiary information, and/or the rules. For example, the risk score may be calculated based on how much information corresponding to the beneficiary is known or learned (e.g., via data mining or machine learning) by the provider computing system 104. In this case, if the beneficiary is a known or trusted beneficiary, then the risk score may be calculated to be relatively low. On the other hand, if little or no information is known about the beneficiary, then the risk score may be calculated to be relatively high. The risk score can be generated based on suitable models that consider context information, account/profile information, transaction history information, beneficiary information, previous fraud claims, and/or $3^{rd}$ party data.

In some arrangements, the provider computing system 104 may notify the customer of the risks associated with the beneficiary, and may instruct the customer to perform sufficient mitigation activities in order to reduce or mitigate the risks. In some embodiments, the provider computing system 104 may incentivize the customer in performing the mitigation activities by, for example, offering fraud insurance and/or reducing a premium associated with the fraud insurance if the customer's mitigation activities are deemed to be sufficient. For example, in some embodiments, the provider computing system 104 may notify the customer that the transaction can be covered under fraud insurance if the customer performs sufficient mitigation activities to reduce or mitigate the risks associated with the beneficiary. In some embodiments, the provider computing system 104 can offer to reduce a premium of the fraud insurance if the customer performs sufficient mitigation activities to reduce or mitigate the risks associated with the beneficiary.

For example, in some embodiments, the computing system 104 may automatically offer (or not offer) fraud insurance based on a level of the risk score. For example, if the risk score is greater than a first threshold value and less than a second threshold value, then the provider computing system 104 may automatically offer the fraud insurance. In this case, the first threshold value may represent a minimum level of risk that would make it likely or plausible that the customer would purchase fraud insurance, and the second threshold value may represent a maximum level of risk that the provider institution 103 is willing to accept in order to insure the electronic transaction. Similarly, if the risk score exceeds the second threshold value, the provider computing system may only offer fraud insurance if the customer performs sufficient mitigation activities in order to reduce or mitigate the risks. In this case, the risk score may automatically be recalculated to determine if the electronic transaction now qualifies for fraud insurance based on the mitigation activities. However, the present disclosure is not limited thereto. For example, in some arrangements, if the risk score is less than the second threshold value, then the provider computing system 104 may automatically offer the fraud insurance, regardless of whether or not the risk score exceeds the first threshold value. In other examples, the fraud insurance may be offered regardless of the level of risk, and the premium for purchasing the fraud insurance may be calculated depending on the risk score.

In some arrangements, the risk analysis circuit 244 includes a risk mitigation circuit 250 that analyzes the customer's mitigation activities for reducing or mitigating the risks associated with the electronic transaction. The risk mitigation circuit 250 may adjust the risk score based on the customer's mitigating activities. For example, in some arrangements, the provider computing system 104 may instruct the customer to establish a prenote with the beneficiary or a potential beneficiary in order to insure that the beneficiary's information (e.g., account and routing number) is correct. In some arrangements the provider computing system 104 may instruct the customer to contact the beneficiary using contact information from a different source (e.g., ERP system, website, and the like) than the contact information that was provided in the instructions for payment (e.g., bill, invoice, or the like) from the beneficiary. In this case, the provider computing system 104 may automatically detect call records from the user device 102 or may instruct the user to upload documentation (e.g., phone records, email records, or the like) showing that the user contacted the beneficiary. The risk mitigation circuit 250 may then compare the contact information with known contact information for the beneficiary (e.g., via the trading partner information, $3^{rd}$ party contacts information, historical transactions data, and/or the like) to determine whether the customer contacted the likely or correct entity that the beneficiary claims to be. If there is a match, then the risk mitigation circuit 250 may adjust (e.g., reduce) the risk score. However, the present disclosure is not limited thereto, and the risk mitigation circuit 250 may analyze any suitable customer mitigation activities to adjust (e.g., reduce) the risk score. For example, in some arrangements, the provider computing system 104 may instruct the user to upload other documentation (e.g., previous transactions with the beneficiary via a different provider institution or the like) that can be used to verify the beneficiary's information (e.g., account and routing number).

FIGS. 3A through 3D are diagrams illustrating an interactive display for notifying a user of a risky transaction, according to some arrangements. In some arrangements, when the risk analysis circuit 244 identifies risks associated with a beneficiary of the pending transaction, a notification or alert may be sent to the user device 102 identifying the risks. The notification may cause the user device 102 to visually display or otherwise indicate the details of the pending transaction. For example, in some arrangements, the user device 102 may display the details of the pending transaction via an interactive dashboard 300 on the banking client application 214, the mobile wallet client application 218, a web application, or any suitable application. The dashboard 300 may provide information about the pending transaction and reasons (e.g., a map, graphical interface, list of risk factors, and/or the like) for why the pending transaction was identified as being a risky transaction. Further, in various arrangements, the dashboard 300 may provide incentives to the customer to perform mitigation activities, such as, for example, offering fraud insurance to be purchased by the user or offering to reduce a premium associated with the fraud insurance (see e.g., FIG. 3B).

Figure 3A:
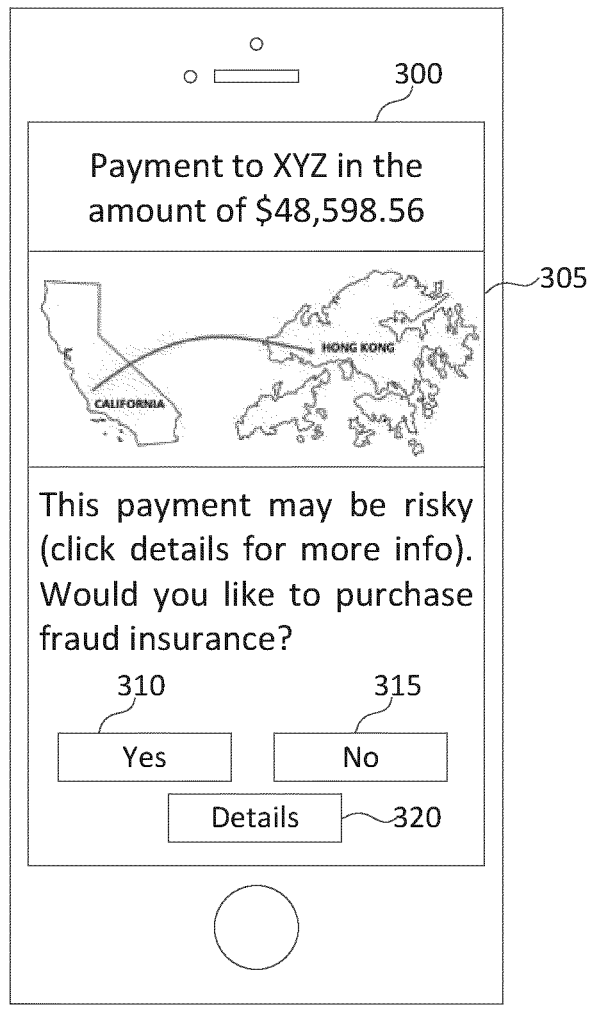
FIGS. 3A-3E are diagrams illustrating an interactive display for notifying a user of a fraud risk transaction, according to some arrangements.
Figure 3B:
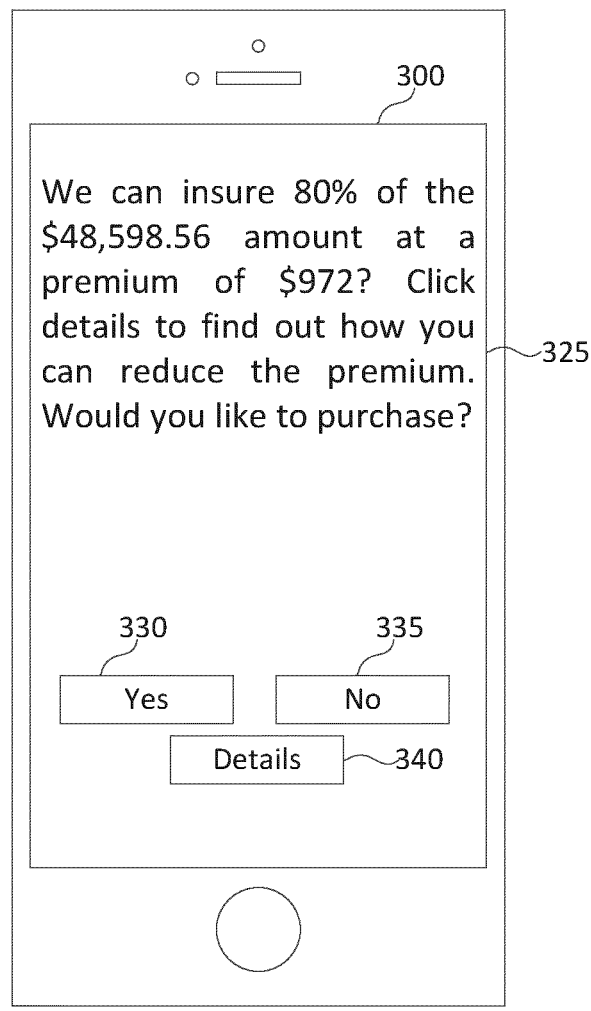
Figure 3C:
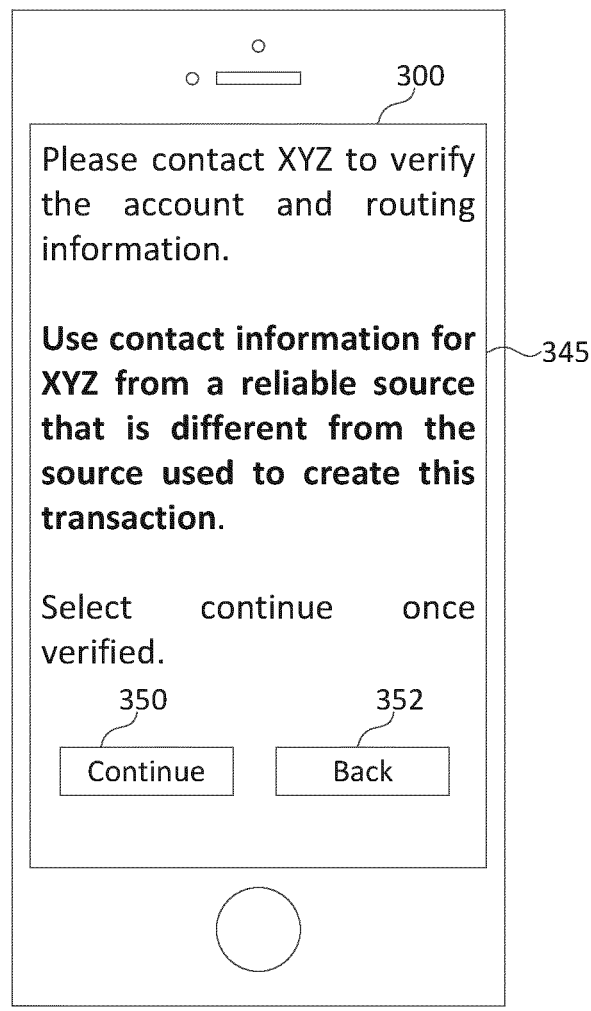
Figure 3D:
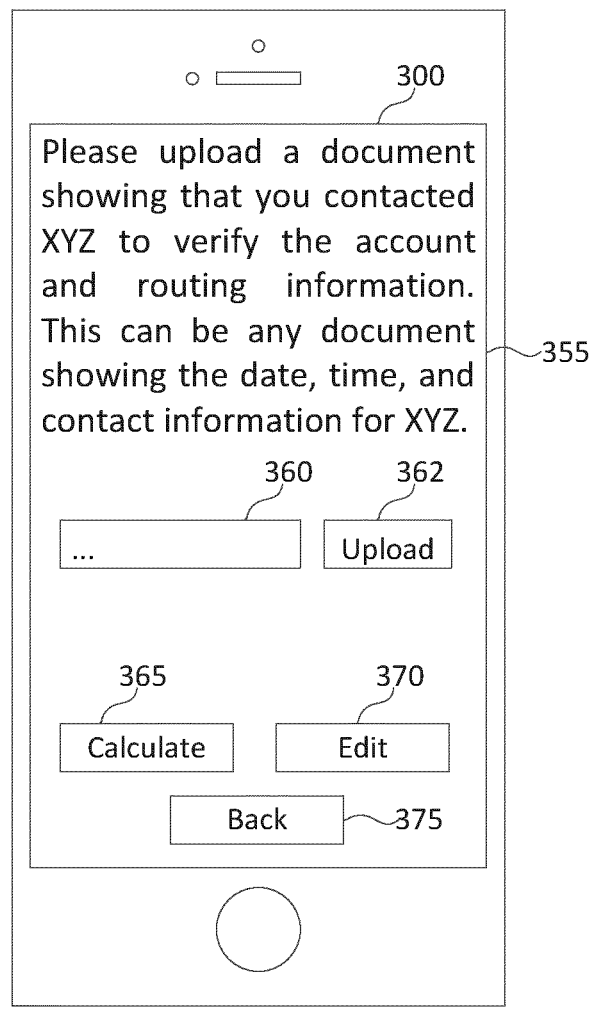

For example, referring to FIG. 3A, in some arrangements, the dashboard 300 may identify the pending transaction, the beneficiary of the pending transaction, and the monetary amount of the pending transaction. In some arrangements, the dashboard 300 may display a map 305 or other graphical interface to allow the user to verify a geographical location where the transaction was initiated, a geographical location or address of the beneficiary, an industry of the user and/or the beneficiary, and/or the like. In some arrangements, the dashboard may provide additional details 320 indicating some risk factors or reasons why the transaction was identified as being risky. For example, if the user selects to receive additional details 320, the dashboard may display the risk factors or reasons why the transaction was identified as being risky. A non-limiting list of some of the risk factors may include, for example, an amount of the transaction exceeding a threshold amount, the beneficiary is new or unknown, the beneficiary has been identified as a potential bad actor (e.g., a fraudster), the location of the beneficiary is known as a hotspot of fraudulent activity, the account information corresponding to the beneficiary does not match the account information known by the provider computing system 104, and/or the like. However, the present disclosure is not limited thereto, and the risk factors may include any suitable risk factors used to identify risks associated with the pending transaction.

In some arrangements, the risk analysis circuit 244 may determine that the transaction qualifies for fraud insurance. For example, the risk analysis circuit 244 may determine that a risk score generated by the risk score generation circuit 246 is within an acceptable threshold of risk in order to qualify for fraud insurance. In some arrangements, the risk analysis circuit 244 may determine that the risk score is greater than a first threshold value and less than a second threshold value. The first threshold value may represent a minimum level of risk that would make it likely or plausible that the customer would purchase fraud insurance, and the second threshold value may represent a maximum level of risk that the provider institution 103 is willing to accept in order to insure the electronic transaction. In some arrangements, the transaction may qualify for fraud insurance if the risk score is less than the second threshold value, regardless of whether or not the risk score exceeds the first threshold value. In some embodiments, if the risk score is greater than the second threshold value, the dashboard may offer fraud insurance only if the user performs sufficient mitigation activities that reduces the risk score to be less than the second threshold value. However, the present disclosure is not limited thereto, and in some arrangements, the transaction may qualify for fraud insurance regardless of the level of risk. In various arrangements, if the transaction qualifies for fraud insurance, the dashboard 300 may display an offer for the fraud insurance for purchase by the user.

For example, still referring to FIG. 3A, if the user selects to decline 315 the fraud insurance, the dashboard may provide options for the user to accept, decline, or edit the transaction. If the user selects to accept 310 the fraud insurance, the dashboard 300 may display an initial quote 325 for the premium in order to purchase the fraud insurance. For example, referring to FIG. 3B, the dashboard 300 may display the initial quote 325 to insure a percentage or whole amount of the transaction. The initial quote 325 can be calculated based on suitable models that consider the context information, the risk score, and/or the insured amount. The user may accept 330 to purchase the fraud insurance at the initial quote purchase price 325, decline 335 the fraud insurance, or select details 340 to reduce the premium.

In some arrangements, if the user selects details 340 in order to reduce the premium (or qualify the transaction for fraud insurance), the dashboard 300 displays instructions 345 for the user to perform mitigation activities in order to reduce the premium (or qualify for fraud insurance). For example, referring to FIG. 3C, in some arrangements, the instructions 345 may instruct the user to contact the beneficiary to verify the beneficiary information (e.g., account and routing number) using contact information from a reliable source that is different from the source used when creating the transaction. For example, if the user relied on the beneficiary information (e.g., account and routing information) that was provided in a bill or invoice, instead of using the contact information that is provided in the bill or invoice, the user should use contact information from a different reliable source to contact the beneficiary, such as, for example, a website, ERP system, business card, or other suitable source. However, the present disclosure is not limited thereto, and in other arrangements, the dashboard 300 may prompt the user to perform any suitable mitigation activities, for example, such as providing transaction data (e.g., a bank statement) from another provider institution corresponding to a previous transaction between the user and the beneficiary. In another example, the instructions 355 may suggest that the user setup a prenote with the beneficiary before sending the payment. The user can then select continue 350 if the user has followed the instructions 345 or select back 352 to go back to any one of the previous screens (e.g., shown in FIGS. 3A and 3B).

If the user selects continue 350, the dashboard 300 prompts the user to upload a document 355 showing that the user contacted the beneficiary to verify the beneficiary information (e.g., account and routing information). The document 355 is used to verify that the user contacted the beneficiary. The document 355 can be any suitable document, such as, for example, call records, emails, text messages, or the like that indicate a date, time, and contact information used to contact the beneficiary. For example, the user can select 360 the document 355 to upload 362 the document 355. However, the present disclosure is not limited thereto, and the provider computing system may detect that the user contacted the beneficiary via any suitable method. For example, in some arrangements, the provider computing system may directly access the call records or emails stored on the user device (e.g., via the banking client application or any suitable application) and may analyze the call records or emails to determine if the user contacted the beneficiary.

The user may then select calculate 265 for the system to adjust the premium (or risk score). For example, in some arrangements, the system may compare the contact information of the beneficiary from the document 355 with known contact information stored (e.g., in the $3^{rd}$ party database, contacts database, or the like) or otherwise received (e.g., from a $3^{rd}$ party contacts management system via API) to determine if the beneficiary information matches. If the beneficiary information matches, the system may reduce the premium (or recalculate the risk score). For example, the system may apply a discount to the premium in response to verifying the match. In some arrangements, if the beneficiary information does not match, the dashboard 300 may display results or detailed information of the mismatch, and may display that the premium (or risk score) cannot be adjusted. In some arrangements, the dashboard 300 may allow the user to edit 370 the transaction. For example, if the user verifies that the beneficiary information is incorrect, the user may select edit 370 to edit the beneficiary information. Further, the user may edit 370 the transaction amount or may cancel the transaction entirely. In some arrangements, if the user select back 375, the dashboard 300 may display any one of the previous screens (e.g., shown in FIGS. 3A through 3C).

Figure 3E:
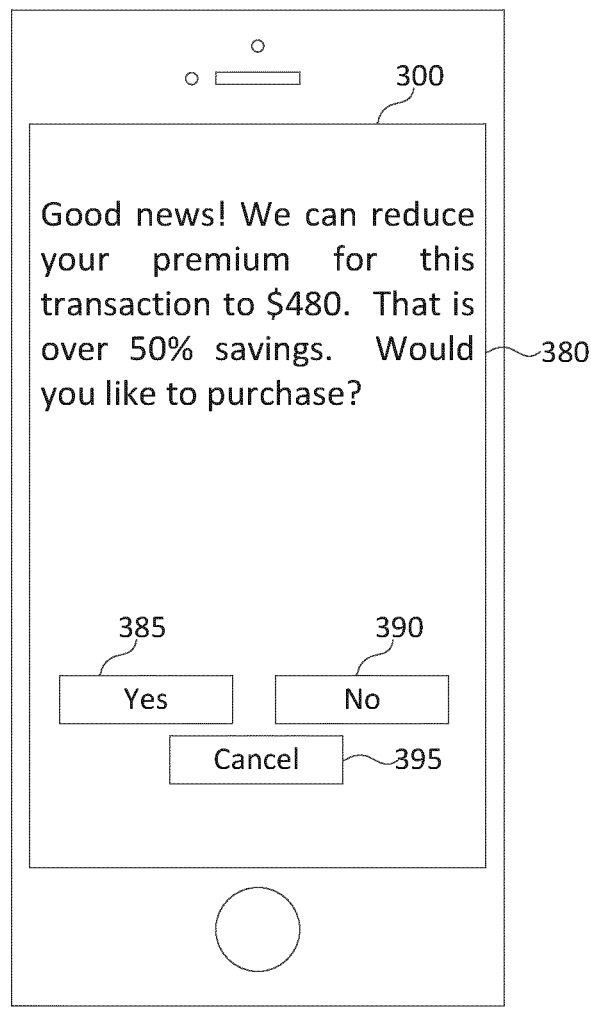

If the system determines that the beneficiary information matches, then system may recalculate or apply a discount 380 to the premium (or risk score). The discount or recalculation of the premium may be calculated based on suitable models that consider the context information, account information, the risk score, and/or the insured amount. For example, referring to FIG. 3E, the dashboard may display that the discount 380 can be applied to the premium. The user can then accept 385 to purchase the fraud insurance at the discounted premium 380, decline 390 to purchase the fraud insurance, or cancel 395 the transaction entirely. If the user declines 390 to purchase the fraud insurance, the user may be prompted to accept or decline the transaction without the fraud insurance.

Figure 4:
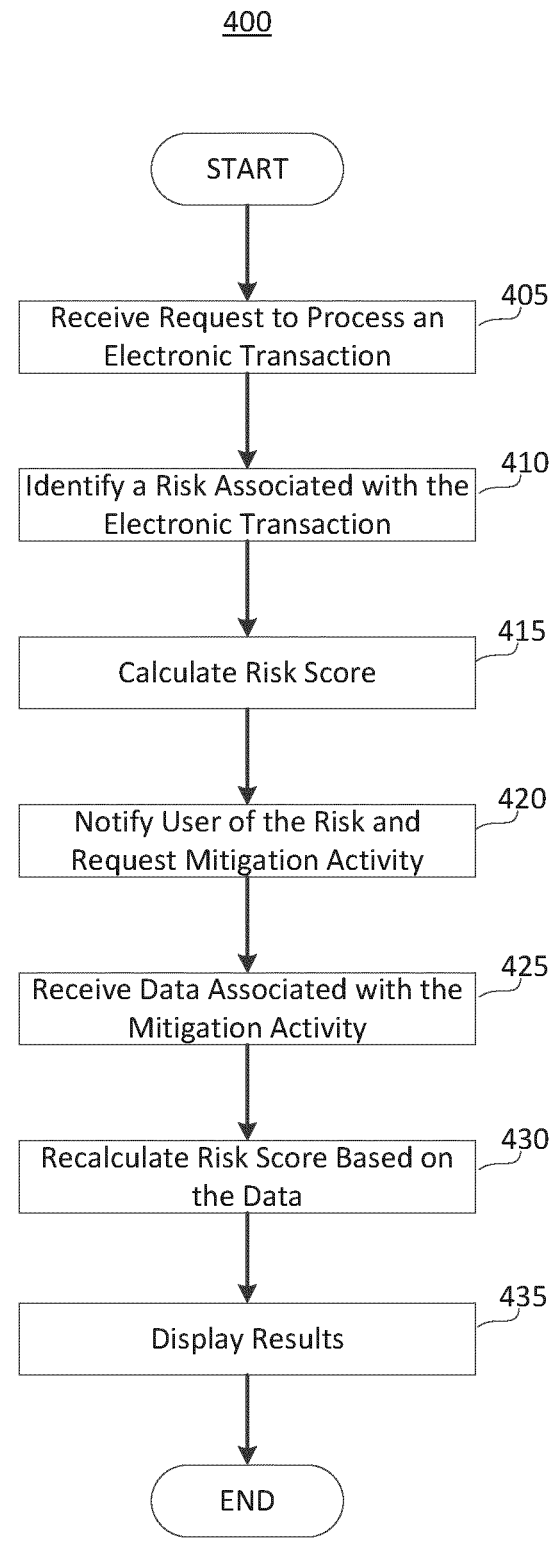
FIG. 4 is a flow diagram of a process or method for providing automated fraud risk analysis services for an electronic transaction, according to some arrangements.

FIG. 4 is a flow diagram of a process or method for providing automated fraud risk analysis services for an electronic transaction, according to some arrangements. Referring to FIG. 4, the process 400 starts and a request to process an electronic transaction is received from a user device at block 405. The electronic transaction may correspond to a payment or transfer of funds from a user of the user device to a beneficiary of the payment or transfer. When processing of the electronic transaction, a risk associated with the electronic transaction is detected at block 410. In some arrangements, the risk may be detected if little or no previous transactional information corresponding to the beneficiary is known. For example, in some arrangements, transactional history data of the user and/or other customers are analyzed to determine if the beneficiary is a known or trusted beneficiary. In some arrangements, the risk is detected if a location of the beneficiary is associated with a hotspot of fraudulent activity. In some arrangements, the risk is detected if an amount of the transaction exceeds a user or automatically defined threshold. In some arrangements, the risk is detected by analyzing $3^{rd}$ party data corresponding to the beneficiary or the electronic transaction. For example, in some arrangements, $3^{rd}$ party data is analyzed to determine if adverse information corresponding to the beneficiary is available, or if the electronic transaction includes one or more attributes of a fraud trend.

In response to identifying the risk, a risk score is calculated for the electronic transaction at block 415. The risk score can be calculated based on suitable models that consider context information, account/profile information, transaction history information, beneficiary information, previous fraud claims, and/or $3^{rd}$ party data. The risk score indicates a level of risk that the electronic transaction is associated with or the result of fraudulent activity. For example, in some embodiments, if the risk score exceeds a threshold value, then the electronic transaction may be identified as a potentially risky transaction.

In some embodiments, if the risk score exceeds the threshold value, then the user is notified of the risk and is instructed to perform one or more mitigation activities in order to reduce or mitigate the risks at block 420. For example, in some embodiments, the notification may case display of a dashboard on the user device to present information about the electronic transaction and the identified risk factors corresponding to the electronic transactions. In some embodiments, the dashboard provides instructions to the user to perform one or more mitigation activities that can help to reduce or mitigate the risks associated with the electronic transaction. In some embodiments, an incentive may be provided to the user to perform the mitigation activities, such as, for example, fraud insurance or a reduction in premiums.

For example, in some arrangements, if the risk score is greater than a first threshold value and less than a second threshold value, then the electronic transaction may qualify to receive an offer for fraud insurance. In this case, the first threshold value may represent a minimum level of risk that would make it likely or plausible that the customer would purchase fraud insurance, and the second threshold value may represent a maximum level of risk that the provider institution 103 is willing to accept in order to insure the electronic transaction. In some arrangements, if the risk score is less than the second threshold value, then the electronic transaction qualifies to receive an offer for fraud insurance, regardless of whether or not the risk score exceeds the first threshold value. In the case that the electric transaction qualifies for fraud insurance, the incentive may include an offer to reduce the premium associated with the fraud insurance by performing the mitigation activities. In some embodiments, the electronic transaction may be qualified for fraud insurance only if the risk score is reduced to below the second threshold value. In this case, the incentive may include an offer to qualify the electronic transaction for fraud insurance if sufficient mitigation activities are performed by the user. However, the present disclosure is not limited thereto. For example, in other examples, the electronic transaction may qualify to receive an offer for fraud insurance regardless of the level of risk. In this case, the incentive may be an offer to reduce the premium if sufficient mitigation activities are performed.

If the user elects to perform mitigation activities to reduce the risks associated with the electronic transaction, data associated with the mitigation activities are received or identified at block 425. For example, the user may be instructed to contact the beneficiary using contact information of the beneficiary from a reliable source that is different from the contact information provided in the source containing the beneficiary's information (e.g., account and routing information). For example, if the user received the beneficiary's information via a bill or invoice, the user should contact the beneficiary using contact information from a reliable source that is different from the bill or invoice (e.g., an ERP system, website, or other reliable sources). However, the present disclosure is not limited thereto, and in other arrangements, the dashboard 300 may prompt the user to perform any suitable mitigation activities, for example, such as providing transaction data (e.g., a bank statement) from another provider institution corresponding to a previous transaction between the user and the beneficiary or setting up a prenote with the beneficiary.

The user may then be prompted to upload a document or other evidence showing that the user contacted the beneficiary to verify the beneficiary information (e.g., account and routing information). The document or other evidence is used to verify that the user contacted the beneficiary. The document or other evidence can be any suitable document or evidence, such as, for example, call records, emails, text messages, or the like that indicate a date, time, and contact information used to contact the beneficiary. However, the present disclosure is not limited thereto, and the evidence may be detected any suitable method. For example, in some arrangements, the provider computing system may directly access the call records or emails stored on the user device (e.g., via the banking client application or any suitable application) and may analyze the call records or emails to determine if the user contacted the beneficiary.

In response to receiving or identifying the mitigation activities, the contact and/or beneficiary information may be compared to contact and/or beneficiary information that is known or available to the provider computing system. For example, the provider computing system may retrieve the contact and/or beneficiary information that is stored in the account database, the contacts database, the $3^{rd}$ party database, the database that is maintained by the $3^{rd}$ party contacts managements system, or any suitable data store to verify the contact and/or beneficiary information. If the contact and/or beneficiary information is verified (or cannot be verified, the risk score is recalculated at block 430. Then, the results of the recalculated risk score may be displayed on the dashboard at block 435. The transaction may be the be completed and the process may end or the user may be instructed to perform additional mitigation activities as the case may be.

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be structured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example arrangements described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web arrangements of the present disclosure could be accomplished with standard programming techniques with rule based logic and other logic to accomplish the various database searching steps, correlation steps, comparison steps and decision steps.

The foregoing description of arrangements has been presented for purposes of illustration and description. It is not intended to be exhaustive or to limit the disclosure to the precise form disclosed, and modifications and variations are possible in light of the above teachings or may be acquired from this disclosure. The arrangements were chosen and described in order to explain the principals of the disclosure and its practical application to enable one skilled in the art to utilize the various arrangements and with various modifications as are suited to the particular use contemplated. Other substitutions, modifications, changes and omissions may be made in the design, operating conditions and arrangement of the arrangements without departing from the scope of the present disclosure as expressed in the appended claims, and their equivalents.

What is claimed is:

1. A computing system comprising: one or more processors; and one or more non-transitory computer-readable storage media communicatively coupled to the one or more processors and having instructions stored thereon that, when executed by the one or more processors, cause the one or more processors to perform the steps of:
    transmitting an electronic transfer application to a user device;
    receiving a request from the user device to initiate an electronic transaction to a beneficiary for an amount, wherein the request comprises a geographic location of the user device;
    collecting, from an enterprise resource planning (ERP) system via an application programming interface (API), trading partner information comprising at least contact information of the beneficiary;
    identifying a risk associated with the beneficiary based in part on the trading partner information and the geographic location of the user device;
    automatically calculating a risk score for the electronic transaction based on the risk;
    determining that the risk score exceeds a first threshold value, and in response to the determination activating the electronic transfer application on the user device and displaying, via the activated electronic transfer application, a notification on the user device associated with the electronic transaction, wherein the notification comprises one or more mitigation activities;
    receiving data from the user device, wherein the data comprises at least contact information corresponding to the beneficiary; retrieving, via the activated electronic transfer application, additional data from device memory of the user device, wherein the additional data comprises call records or emails, wherein the call records or emails comprise a date, time, and contact information of the correspondence; comparing the trading partner information and the received data with additional data corresponding to the call records or the emails, wherein comparing comprises analyzing the call records or the emails comprising the date, time, and contact information of the correspondence and determining that the user conducted at least one of the displayed mitigation activities wherein the at least one of the displayed mitigation activities comprises contacting the beneficiary;
    in response to determining that the user conducted the mitigation activity, recalculating the risk score based on the mitigation activity;
    determining that the recalculated risk score is less than the first threshold value, calculating a discount to a fraud insurance; and
    transmitting to, and displaying on, the user device an offer comprising the discount via the electronic transfer application.

2. The system of claim 1, wherein the electronic transaction corresponds to an electronic payment or an electronic transfer of funds from the user to the beneficiary.

3. The system of claim 2, wherein the identifying of the risk comprises: identifying if there are one or more previous electronic transactions corresponding to the beneficiary by analyzing transactional history data stored in a data store.

4. The system of claim 2, wherein the identifying of the risk comprises: analyzing the geographical location corresponding to the beneficiary; and determining from data stored in a data store that the geographical location is associated with fraudulent activity.

5. The system of claim 1, wherein the one or more mitigation activities comprises contacting the beneficiary to verify a beneficiary's account and routing number using the contact information of the beneficiary.

6. The system of claim 1, wherein the one or more mitigation activities comprises uploading transactional data corresponding to a previous transaction with the beneficiary from a different provider institution.

7. The system of claim 1, wherein the one or more mitigation activities comprises establishing a pre-note with the beneficiary.

8. The system of claim 1, wherein the non-transitory computer-readable storage media communicatively coupled to the one or more processors and having additional instructions stored thereon that when executed by the one or more processors, cause the one or more processors to perform the steps of:
   offering, on the dashboard, the fraud insurance for the electronic transaction when the risk score calculated based on the risk is between the first threshold value corresponding to the minimum level of risk that would make the fraud insurance appealing to the user and the second threshold value corresponding to the maximum level of acceptable risk to insure the electronic transaction;
   calculating a premium to purchase the fraud insurance based on the risk score calculated based on the risk of the electronic transaction; and adjusting the premium based on the recalculated risk score.

9. A method comprising:
   transmitting, by one or more processors of a computing system, an electronic transfer application to a user device;
   receiving, by the one or more processors, a request from the user device to process an electronic transaction to a beneficiary for an amount, wherein the request comprises a geographic location of the user device;
   collecting, by the one or more processors from an enterprise resource planning (ERP) system via an application programming interface (API), trading partner information comprising at least contact information of the beneficiary;
   identifying, by the one or more processors, a risk associated with the beneficiary based in part on the trading partner information and the geographic location of the user device;
   automatically calculating, by the one or more processors, a risk score for the electronic transaction based on the risk;
   determining, by the one or more Processors, that the risk score exceeds a first threshold value, and in response to the determination activating the electronic transfer application on the user device and displaying, by the one or more processors and via the activated electronic transfer application, a notification on the user device associated with the electronic transaction, wherein the notification comprises one or more mitigation activities;
   receiving, by the one or more processors, data from the user device, wherein the data comprises at least contact information corresponding to the beneficiary;
   automatically retrieving, by the one or more processors via the activated electronic transfer application, additional data from device memory of the user device,
   wherein the additional data comprises call records or emails, wherein the call records or emails comprise a date, time, and contact information of the correspondence;
   comparing, by the one or more processors, the trading partner information and the received data with additional data corresponding to the call records or the emails, wherein comparing comprises analyzing the call records or the emails comprising the date, time, and contact information of the correspondence and determining that the user conducted at least one of the displayed mitigation activities wherein the at least one of the displayed mitigation activities comprises contacting the beneficiary;
   in response to determining that the user conducted the mitigation activity, recalculating, by the one or more processors, the risk score based on the mitigation activity;
   determining that the recalculated risk score is less than the first threshold value, calculating, by the one or more processors, a discount to a fraud insurance; and
   transmitting to, and displaying on, by the one or more processors, the user device an offer comprising the discount via the electronic transfer application.

10. The method of claim 9, wherein the electronic transaction corresponds to an electronic payment or an electronic transfer of funds from the user to the beneficiary.

11. The method of claim 10, wherein the identifying of the risk comprises: identifying, by the one or more processors, if there are one or more previous electronic transactions corresponding to the beneficiary by analyzing transactional history data stored in a data store.

12. The method of claim 10, wherein the identifying of the risk comprises: analyzing, by the one or more processors, the geographical location corresponding to the beneficiary; and determining, by the one or more processors, from data stored in the data store that the geographical location is associated with fraudulent activity.

13. The method of claim 9, wherein the one or more mitigation activities comprises contacting, by the user device, the beneficiary to verify a beneficiary's account and routing number using contact information of the beneficiary.

14. The method of claim 9, wherein the one or more mitigation activities comprises uploading, by the user device, transactional data corresponding to a previous transaction with the beneficiary from a different provider institution.

15. The method of claim 9, wherein the one or more mitigation activities comprises establishing, by the user device, a pre-note with the beneficiary.

16. The method of claim 9, further comprising:
   offering, by the one or more processors, fraud insurance for the electronic transaction when the risk score calculated based on the risk is between the first threshold value corresponding to the minimum level of risk that would make the fraud insurance appealing to the user and the second threshold value corresponding to the maximum level of acceptable risk to insure the electronic transaction;
   calculating, by the one or more processors, a premium to purchase the fraud insurance based on the risk score calculated based on the risk of the electronic transaction; and
   adjusting, by the one or more processors, the premium based on the recalculated risk score.

17. A non-transitory computer-readable medium having processor-readable instructions stored thereon such that, when executed by a processor, causes the processor to perform the steps of:
- transmitting an electronic transfer application to a user device;
- receiving a request from the user device to process an electronic payment or an electronic transfer of funds from the user to a beneficiary for an amount, wherein the request comprises a geographic location of the user device;
- collecting, from an enterprise resource planning (ERP) system via an application programming interface (API), trading partner information comprising at least contact information of the beneficiary;
- identifying a risk associated with the beneficiary based in part on the trading partner information and the geographic location of the user device;
- automatically calculating a risk score for the electronic payment or the electronic transfer of funds based on the risk;
- determining that the risk score exceeds a first threshold value, and in response to the determination activating the electronic transfer application on the user device and displaying, via the activated electronic transfer application, a notification on the user device associated with the electronic payment or the electronic transfer of funds, wherein the notification comprises one or more mitigation activities;
- receiving data from the user device, wherein the data comprises at least contact information corresponding to the beneficiary;
- retrieving, via the activated electronic transfer application, additional data from device memory of the user device, wherein the additional data comprises call records or emails, wherein the call records or emails comprise a date, time, and contact information of the correspondence;
- comparing the trading partner information and the received data with additional data corresponding to the call records or the emails, wherein comparing comprises analyzing the call records or the emails comprising the date, time, and contact information of the correspondence and determining that the user conducted at least one of the displayed mitigation activities wherein the at least one of the displayed mitigation activities comprises contacting the beneficiary;
- in response to determining that the user conducted the mitigation activity, recalculating the risk score based on the mitigation activity;
- determining that the recalculated risk score is less than the first threshold value, calculating a discount to a fraud insurance; and
- transmitting to, and displaying on, the user device an offer comprising the discount via the electronic transfer application.

* * * * *